No. 695,502. Patented Mar. 18, 1902.
T. T. SMITH.
AUTOMATIC PAN LIFTER.
(Application filed Apr. 16, 1901.)
(No Model.) 2 Sheets—Sheet 1.

Witnesses
Inventor
T. Twain Smith
per O. E. Duff, Att'y.

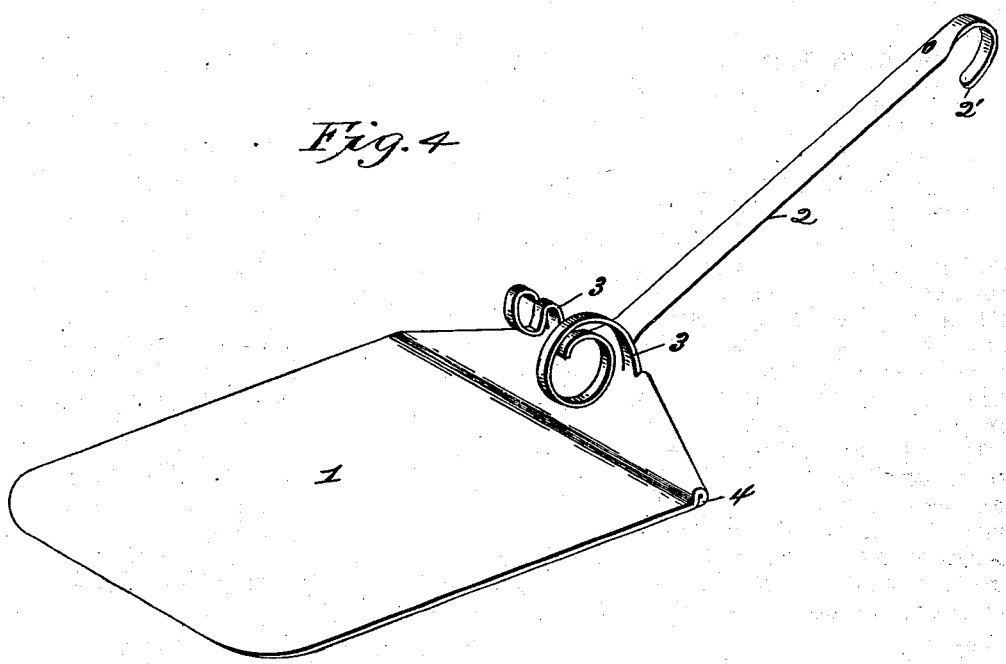

UNITED STATES PATENT OFFICE.

THOMAS TOWSON SMITH, OF NEAR WARRENTON, VIRGINIA.

AUTOMATIC PAN-LIFTER.

SPECIFICATION forming part of Letters Patent No. 695,502, dated March 18, 1902.

Application filed April 16, 1901. Serial No. 56,137. (No model.)

*To all whom it may concern:*

Be it known that I, THOMAS TOWSON SMITH, a citizen of the United States, residing near Warrenton, in the county of Fauquier and State of Virginia, have invented certain new and useful Improvements in Automatic Pan-Lifters; and I do hereby declare the following to be a full, clear, and exact description of the invention, such as will enable others skilled in the art to which it appertains to make and use the same.

My invention relates to "pan-lifters," and has for its object to provide a device of this class easily and quickly to withdraw a pan or other cooking utensil from a stove and automatically hold the same firmly and securely, thus obviating the use of cloths and saving the hands of those in the culinary department.

A further object of my invention is to provide a pan-lifter which is constructed in such a manner that the automatic holding device, pan-lifter handle, and reinforcing portions are integral and are stamped out of a single sheet of suitable metal, thus making the same an article extremely cheap and easy of manufacture and at the same time simple, durable, and efficient.

With these objects in view my invention consists in the novel arrangement and construction of my pan-lifter and in the automatic spring pan-holding device.

My invention also consists in certain other novel features of construction, which will hereinafter be fully described and afterward specifically pointed out in the appended claim.

Figure 1:
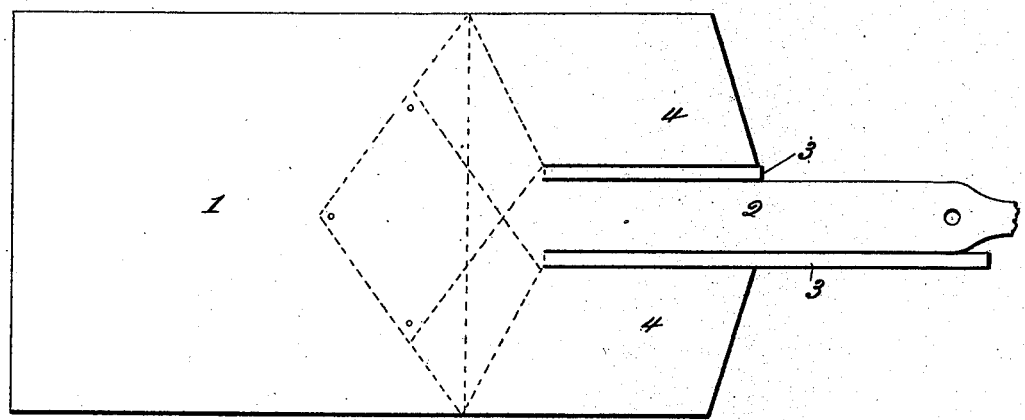
Figure 2:
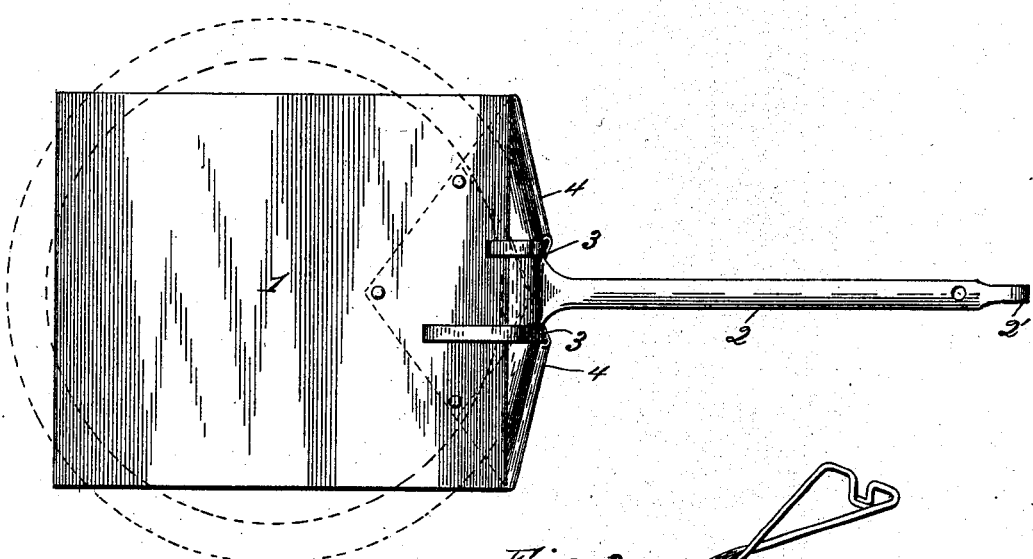
Figure 3:
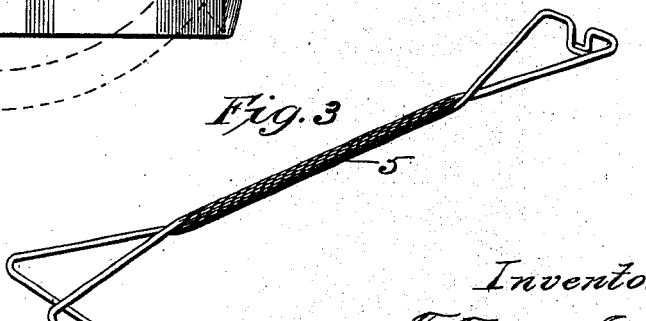

Referring to the accompanying drawings, Figure 1 is a plan view of the blank of my pan-lifter, my method of reinforcing being shown in dotted lines. Fig. 2 is a plan view of my pan-lifter in an operative position and holding a pan shown in dotted lines. Fig. 3 is a perspective view of my combined hook and lifter used in conjunction with the pan-lifter proper. Fig. 4 is a perspective view of my pan-lifter.

Like numerals of reference indicate the same parts throughout the several figures, in which—

1 is a pan-lifter; 2, the handle, having the hooked end 2'; 3, the automatic spring pan-holder, and 4 the reinforcing portions.

5 is my combined pan hook and lifter.

The entire pan-lifter is stamped out of a single sheet of metal, preferably steel. The reinforcing portions 4 are bent under, as shown in dotted lines in Fig. 1, and riveted, as shown in Fig. 2. The handle-blank is then rounded to form the handle 2, and the automatic spring pan-holders are formed as shown in Fig. 4. In Fig. 1 I show the blanks of said holder of different lengths. This is merely to show a modification, as represented in Fig. 4, the longer one being formed in a spiral, while the shorter is brought up, then obliquely down, and then curved upwardly and backwardly; nor do I wish to limit myself to these constructions, as these spring-holders may be formed in a number of shapes, although serving the same purpose.

When it is desired to withdraw a pan from a stove, the pan-lifter is simply pushed under the pan, as shown in Fig. 2, whereupon the spring pan-holders spring over the edge of the pan and securely hold. Should the pan be a heavy one, I use my combined hook and lifter to pull the pan upon the pan-lifter proper and then catch the hooked end 7 in one of the pan-handles, thus equalizing the weight and greatly assisting the removal of the pan from the stove.

The simplicity of my invention is at once apparent, and I do not wish to be understood as limiting myself to the exact construction as herein set forth, as various slight changes might be made therein by those skilled in the art, and I consider myself entitled to all such changes and modifications.

What I claim as new, and desire to secure by Letters Patent of the United States, is—

As an article of manufacture, a pan-lifter composed of a body portion, a handle extending therefrom, reinforcing portions turned upon and secured to said body portion, automatic spring pan-holders formed on either side of said handle, and provided with rounded bottoms, whereby said holders automatically engage the edge of the pan after the same is slid under said holders; all the parts being integral and stamped out of a single sheet of metal, substantially as described.

In testimony whereof I affix my signature in presence of two witnesses.

THOMAS TOWSON SMITH.

Witnesses:
C. K. JOHNSON,
JOSEPH A. JEFFRIES.